United States Patent
Takami et al.

(10) Patent No.: US 11,610,096 B2
(45) Date of Patent: Mar. 21, 2023

(54) EVALUATION SYSTEM FOR MEASURED DATA FROM MULTIPLE DOMAINS

(71) Applicant: Robert Bosch GmbH, Stuttgart (DE)

(72) Inventors: Masato Takami, Hildesheim (DE); Uwe Brosch, Algermissen (DE); Dimitrios Bariamis, Hildesheim (DE); Emil Schreiber, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 216 days.

(21) Appl. No.: 17/110,946

(22) Filed: Dec. 3, 2020

(65) Prior Publication Data

US 2021/0182652 A1 Jun. 17, 2021

(30) Foreign Application Priority Data

Dec. 16, 2019 (DE) .......................... 102019219734.5

(51) Int. Cl.
| | |
|---|---|
| *G06N 3/04* | (2006.01) |
| *G06N 3/08* | (2006.01) |
| *G06V 20/56* | (2022.01) |
| *G01S 17/89* | (2020.01) |
| *G01S 13/89* | (2006.01) |
| *G01S 15/89* | (2006.01) |

(52) U.S. Cl.
CPC ................ *G06N 3/04* (2013.01); *G06N 3/08* (2013.01); *G06V 20/56* (2022.01); *G01S 13/89* (2013.01); *G01S 15/89* (2013.01); *G01S 17/89* (2013.01)

(58) Field of Classification Search
CPC ............. G06V 20/56; G06N 3/04; G06N 3/08
See application file for complete search history.

(56) References Cited

U.S. PATENT DOCUMENTS

| 10,678,244 B2 * | 6/2020 | Iandola ................ G06K 9/6257 |
| 2021/0063535 A1 * | 3/2021 | Hakobyan ............. G01S 13/931 |

FOREIGN PATENT DOCUMENTS

| DE | 102016107064 A1 | 10/2016 |
| DE | 102017112992 A1 | 12/2017 |
| DE | 102017212835 A1 | 1/2019 |
| DE | 102019113114 A1 | 12/2019 |
| EP | 0870132 B1 | 4/2000 |

* cited by examiner

*Primary Examiner* — Bryan Bui
(74) *Attorney, Agent, or Firm* — Norton Rose Fulbright US LLP; Gerard Messina

(57) ABSTRACT

An evaluation system for processing measured data which include physical measured data detected with the aid of one or multiple sensors, and/or realistic synthetic measured data of the sensor(s), into one or multiple evaluation results. The system includes at least two input stages independent from each other, which are designed to receive measured data and process these measured data into precursors. At least one processing stage, receives the precursors from all input stages as inputs and is designed to process one or multiple input precursor(s) into a shared intermediate product. At least one output stage, which is designed to process the intermediate product into one or multiple evaluation result(s) of the evaluation system. A method for training the evaluation system. A method for operating the evaluation system is also provided.

11 Claims, 3 Drawing Sheets

EVALUATION SYSTEM FOR MEASURED DATA FROM MULTIPLE DOMAINS

CROSS REFERENCE

The present application claims the benefit under 35 U.S.C. § 119 of German Patent Application No. DE 102019219734.5 filed on Dec. 16, 2019, which is expressly incorporated herein by reference in its entirety.

FIELD

The present invention relates to evaluation systems, which may be used, for example, to evaluate measured data detected from vehicles.

BACKGROUND INFORMATION

For a vehicle to move in road traffic in an at least semi-automated manner, it is necessary to detect the surroundings of the vehicle and to initiate countermeasures if a collision with an object in the surroundings is about to occur. The creation of a surroundings representation and localization are also necessary for safe automated driving.

To be able to derive decisions regarding the further behavior of the host vehicle from the physical observation of the vehicle surroundings, trainable evaluation systems are frequently used. Similar to a human driver, who typically drives less than 100 hours and covers less than 1,000 km before acquiring a driver's license, these systems are able to generalize knowledge gathered from a limited supply of training data and apply it to a multitude of further situations, which were not the object of the training.

The training of an evaluation system of this type may typically be used in later active operation only to evaluate measured data which were physically detected in an equivalent manner as the training data. Just upgrading a sensor to a successor model that works in a slightly different physical manner may render the previously completed training obsolete.

To make subsequent changes easier, German Patent Application No. DE 10 2017 212 835 A1 describes training modules of an evaluation system, which are responsible for different driving maneuvers, separately from each other.

SUMMARY

Within the scope of the present invention, a trainable evaluation system is provided. In accordance with an example embodiment of the present invention, this evaluation system is designed to process measured data into one or multiple evaluation results. The measured data were detected with the aid of one or multiple sensor(s), and/or they include realistic synthetic measured data of the sensor(s). Realistic synthetic measured data may be used, for example instead of or in combination with actually physically recorded measured data, for training the evaluation system. A data set containing realistic synthetic measured data of a sensor is typically difficult to distinguish from measured data actually physically recorded with the aid of this sensor.

In particular, optical or thermal cameras, ultrasonic sensors, radar sensors as well as LIDAR sensors are suitable as sensors. Correspondingly, the measured data may include, in particular, for example image data or video data or multiple imaging modalities.

The evaluation system may embody, in particular, a function parameterized with adaptable parameters, ideally having great power of generalization. The parameters may be adapted during the training of the evaluation system, in particular in such a way that the associated learning evaluation results are preferably effectively reproduced upon the input of learning measured data into the evaluation system. The evaluation system may include, in particular, an artificial neural network (ANN), and/or it may be designed as an ANN.

The evaluation system includes at least two independent input stages, which are designed to receive measured data and to process these measured data into precursors (i.e., pre-products). The input stages may be supplied with the measured data, for example from physical sensors, such as cameras. There does not have to be a 1:1 assignment between these sensors and the input stages.

For example, the measured data from multiple similar sensors may be combined in one shared input stage. For example, multiple cameras of the same design may monitor different subareas of the surroundings of a vehicle.

Conversely, for example the same measured data originating in one or also multiple sensor(s) may, however, be supplied simultaneously to multiple input stages having different architectures. In this way, the architecture which is advantageous for processing these particular measured data may also be learned during the training of the evaluation system.

One processing stage receives the precursors from all input stages as inputs. This processing stage is designed to process one or multiple precursor(s) into a shared intermediate product.

Finally, at least one output stage is provided, which is designed to process the intermediate product into one or multiple evaluation result(s) of the evaluation system.

In particular, the fact that the input stages are "independent" may involve, for example, the fact that the result of the processing of measured data by one input stage is independent of the measured data supplied to the other input stages.

It has been recognized that this new structure of the evaluation system makes it surprisingly easier to at least partially reuse a training completed with the aid of training data from a first physical domain for metrologically detected measured data in a second physical domain.

For example, if measured data are provided at different input stages during the training of the evaluation system, which relate to the same situation but were metrologically detected using different sensors, a tendency emerges that the input stages learn knowledge which is specific to the particular metrological detection. The processing stage simultaneously learns knowledge which is equally valid for all types of metrological detection used.

For example, the measured data may include images which were recorded with the aid of different cameras, and the evaluation results may relate to a content evaluation of the images with regard to other road users, road signs or other traffic-relevant objects contained therein. In this situation, a division of work will set in during the training in such a way that the processing stage primarily learns the content evaluation of the images, while each input stage primarily learns to optimally preprocess the images recorded by the particular camera for this evaluation.

For different reasons, the situation may now occur that a camera other than the one used for training the evaluation system must be installed in the later series manufacturing of a vehicle.

A general preference thus exists for using particularly high quality cameras for detecting training data, since the physical detection constitutes only a comparatively small portion of the costs. By far the largest share of the costs goes to labeling the training data with the significance relevant for the particular application, for example including indications of the traffic-relevant objects actually visible in the images. This labeling typically requires human work. Labeled training data are therefore expensive and in short supply, so that it appears sensible to physically detect them in the best possible quality.

This problem may be only partially circumvented by using the same camera provided for the later series manufacturing from the outset for detecting the training data. Several years may pass between the training during the prototype development of the vehicle and the later series manufacturing. There is therefore no guarantee at the time of the training that the camera provided at the time of the series manufacturing is even continuously available on the market at all. The innovation cycles for cameras and other sensors are much shorter than the innovation cycles for vehicles. The camera may thus have already been replaced by a new model at the time of series manufacturing. Moreover, it may also be difficult to guarantee a supply of spare parts for this specific camera for the lifespan of a vehicle of up to 20 years.

However, if the content evaluation is now concentrated in the processing stage by the training and is the same for all cameras, a short retraining at most is required to enable the evaluation system to also evaluate the contents of the images supplied by a new camera. Due to its great power of generalization, the evaluation system may ideally learn quite abstractly to even evaluate images during the course of the training, which originate in any arbitrary camera.

The situation is then more or less analogous to one in which a human driver gets used to a new vehicle type. From the driver's seat in the new vehicle, the driver will observe the surroundings of the vehicle possibly from a different perspective. The driver will thus have to familiarize himself/ herself with the location where the switch for the lights is mounted and how the reverse gear lock works. However, he/she will not have to learn how to drive all over again.

At least two input stages of the evaluation system may be particularly advantageously designed to process physical measured data which were detected with the aid of different sensors and/or realistic synthetic measured data of these sensors to process as measured data. The evaluation system is then particularly well suited for merging measured data which were obtained with the aid of different physical modalities (such as different camera types, radar or LIDAR) but which relate to the same investigated object or to the same setting.

In one particularly advantageous embodiment of the present invention, each input stage includes a layered arrangement of neurons and/or other processing units of the ANN. In this way, the measured data processed by different input stages may be standardized and abstracted in such a way that they may be processed in the same way by the processing stage. This applies, in particular, if at least one layer in each input stage is designed as a convolution layer. In particular, the arrangement in the input stage may be divided, for example, into at least two layers.

The processing in the output layer may, in turn, be at least partially specific to the particular type of metrological detection. For example, the images detected by different cameras may potentially output images having different pixel resolutions. For example, if a semantic segmentation of the images is sought to determine which image pixels belong to which object, one and the same object will occur in different positions in images having different pixel resolutions.

A 1:1 assignment between output stages, on the one hand, and cameras or other sensors, on the other hand, is however not necessary. Similar to the assignment between input stages and sensors, full flexibility exists here.

For example, one and the same output stage may be used to form evaluation results which were compiled from the measured data supplied by different sensors. For example, if the surroundings of a vehicle are monitored by multiple cameras which each cover spatial subareas of these surroundings, a classification of the objects contained in the particular images may then be called up from one and the same output stage.

Conversely, one and the same intermediate product compiled from measured data from one or multiple sensors may be supplied to multiple output stages having different architectures. In this way, it is possible to also learn which output stage is able to process this particular intermediate product into the best end result during the training of the evaluation system.

In another particularly advantageous embodiment of the present invention, the processing stage includes a layered arrangement of neurons and/or other processing units of the ANN. The processing stage then has a sufficient capacity to learn the largest portion of a content evaluation of the measured data. To intensify the tendency that the content evaluation is concentrated in the processing stage, the processing stage may have, in particular, an arrangement divided into more layers than the input stages. In particular, the arrangement in the processing stage may be divided, for example, into at least three layers.

It is furthermore advantageous to form at least one layer in the processing stage as a convolution layer and at least one layer as a pooling layer or as a fully networked layer. These are the layer types which are primarily needed for a content evaluation of the measured data. Their presence in the processing stage thus intensifies the desirable tendency to concentrate the content evaluation in the processing stage.

In a further advantageous embodiment of the present invention, at least one output stage includes an arrangement of neurons and/or other processing units of the ANN, which provide the functionality of a convolution layer of the ANN and/or the functionality of a fully networked layer of the ANN. These layers are typically used to form the evaluation results at the very end of the processing chain. They may embody, in particular, that knowledge which is necessary to form evaluation results for certain specific purposes.

As explained above, an advantage of the evaluation system in accordance with the present invention is that it may be trained in a way which enables an extensive reuse of a training, once completed, when changing the sensors used for data recording. The present invention therefore also relates to a method for training this evaluation system.

In accordance with an example embodiment of the present invention, within the scope of the method, learning measured data are supplied to the evaluation system. Parameters which characterize the behavior of the evaluation system are optimized with the goal that evaluation results supplied by the evaluation system in accordance with at least one cost function coincide preferably well with the learning evaluation results belonging to the learning evaluation results. The learning measured data, which are supplied to at least two different input stages of the evaluation system, include physical measured data detected with the aid of different sensors.

Alternatively or in combination to this, the learning measured data may also include realistic synthetic measured data of these sensors. Synthetic measured data of this type are frequently used to mitigate a shortage of training data. Upon observation, it may be difficult to distinguish them from "real" measured data, which are actually detected with the aid of the particular sensor.

As explained above, this particular input stage is trained whenever measured data are supplied to an input stage. However, the processing stage is always also trained at the same time. This means that the learning experience conveyed across all input stages is combined in the processing stage, where it accumulates.

This, in turn, helps in situations in which labeled training data are in particularly short supply, particularly with regard to a certain sensor, i.e., with regard to a certain domain. The specific training of the input stage assigned to this sensor makes do with a comparatively small amount of training data. For the content evaluation, however, the processing stage may be accessed, which is already pre-trained based on other training data.

The different input stages may be trained alternately, consecutively or also simultaneously. This means that measured data are always applied to only one input stage at a time during the training, while measured data may also be applied to multiple or all input stages simultaneously. The input stages should advantageously be trained simultaneously. This means that the same number of data sets containing learning measured data is supplied to each input stage for each training step separated by an evaluation of the cost function and subsequent backpropagation of the error. In this way, the tendency may be counteracted that the evaluation system adapts too much to the processing of measured data from one of the physical domains used.

In a further particularly advantageous embodiment of the present invention, the parameters are additionally optimized with respect to a standardization measure. This standardization measure supplies better values the better the precursors generated by different input stages and relating to the same situation coincide with one another. In this way, the tendency is further intensified that the specifics of the different sensors are handled in the input stages assigned to each of these sensors and the actual content evaluation takes place in an essentially uniform manner separately thereof. The standardization measure may make, for example, a contribution to the cost function used for the training, so that the standardization is trained simultaneously with the content evaluation. However, the parameters of the processing stage may also be recorded, for example after the actual training, and the parameters of one or multiple input stage(s) may be further optimized with respect to a preferably good standardization measure.

In a further particularly advantageous embodiment of the present invention, the learning measured data supplied to the at least two different input stages of the evaluation system are also supplied to a further universal input stage and processed by the universal input stage into precursors. For example, a first input stage then receives measured data of a first sensor, a second input stage receives measured data of a second sensor, and a third input stage, as the universal input stage, receives measured data of both sensors. The precursors supplied by the universal input stage are incorporated into the assessment by the standardization measure. In this way, the universal input stage is trained to process measured data of all sensors used in the training, and ideally also further sensors in general, into precursors, which are essentially similar to the precursors supplied by the other input stages. Ideally, the universal input stage therefore learns to process measured data also from new, unknown sensors, due to the power of generalization intrinsic to the evaluation system, without another training being necessary for this purpose.

For this purpose, only the parameters of the evaluation system characterizing the behavior of the universal input stage may be particularly advantageously changed during the optimization of the standardization measure. This means that those parameters which characterize the behavior of the other input stages, the behavior of the processing stage, and the behavior of the output stages remain unchanged. In this way, the training of the universal input stage becomes a pure add-on and does not influence the previously completed training of the other input stages, the processing stage, and the output stages.

If a universal input stage was trained in the manner described, this creates, during the operation of the evaluation system with the aid of actually sensor-detected measured data, a selection option of using an input stage specializing in the processing of measured data of a particular sensor, using the universal input stage, or forming a sensible combination of these alternatives, due to its training.

The present invention therefore also relates to a method for operating an evaluation system, which was trained using a universal input stage.

In accordance with an example embodiment of the present invention, in this method, a set of measured data is supplied to a first input stage of the evaluation system and processed by the evaluation system into a first set of evaluation results. The same set of measured data is also supplied to the universal input stage of the evaluation system and processed by the evaluation system into a second set of evaluation results.

Uncertainties of the first set of evaluation results and uncertainties of the second set of evaluation results are ascertained. An end result of the processing, i.e., a set of evaluation results definitively consolidated for further use, is ascertained from the two sets of evaluation results.

The uncertainties may be determined according to arbitrary criteria and measures, depending on which type of uncertainty is particularly disadvantageous for the provided application. Many common evaluation methods, such as classification and regression, also deliver a confidence and/or uncertainty along with their particular result.

The specific stipulation for ascertaining the evaluation results is directed to the needs of the application in which these evaluation results are to be used. For example, the two sets of evaluation results may be offset against each other in a weighted manner, the weights being ascertainable based on the uncertainties.

In a further particularly advantageous embodiment of the present invention, that set of evaluation results having the better uncertainty is established as the end result of the processing. The maxim may be implemented here that an input stage specializing in the processing of data of certain types of sensors for the processing of a concrete set of measured data may be suitable either only to a certain extent or not at all. If no specialized input stage turns out to be particularly suitable, the use of the universal input stage is best physically motivated.

For example, one of the input stages may specialize in preprocessing images which were recorded by a camera including a fisheye lens. If the images recorded by a new, unknown camera then have enormous similarity with the images recorded using the fisheye lens, the input stage assigned to the camera including the fisheye lens is best suited to also process the images of the new camera.

In a further advantageous embodiment of the present invention, an activation signal is ascertained from the end result of the processing. A vehicle, a system for monitoring an area, a classification system, a system for the quality control of series-manufactured products and/or a system for medical imaging are activated with the aid of the activation signal.

The physical measured data, or the realistic synthetic measured data, may be measured data of an optical or thermal camera and/or measured data of a scan of a spatial area with the aid of radar, LIDAR and/or ultrasound. These may be the most important measuring modalities used for monitoring the surroundings of vehicles, in particular for driving assistance systems or for the purpose of at least semi-automated driving.

For example, the evaluation results may include, in particular,
- at least one class ascertained from the measured data as the result of a classification;
- at least one regression value ascertained from the measured data as the result of a regression; and/or
- at least one semantic segmentation of the measured data; and/or
- at least one image reconstructed from the measured data; and/or
- synthetic measured data, such as synthetic images.

For example, images or other measured data may be classified as to which other road users, road edges, traffic signs and other traffic-relevant objects are indicated by these measured data. A regression value may indicate, for example, a direction in which an object moves and/or a speed at which the object moves. A semantic segmentation may assign any pixel, voxel, stixel or any comparable elementary constituent of the measured data to an object or a type of objects (such as "road edge," "passenger car," "truck," "pedestrian," "traffic sign"). A semantic segmentation of this type is thus a representation of the setting observed by sensors, which may be automatically interpreted, for example, by a driving assistance system or a system for at least semi-automated driving.

As explained above, the training described above, in particular, enables the evaluation system to process, with little overall training complexity, measured data into evaluation results from more physical domains whose contents are applicable to the particular situation. This means that technical systems which work with these evaluation results carry out an appropriate reaction to the particular situation with a high degree of probability. The result of the training is embodied in the parameters which characterize the behavior of the evaluation system. Anyone who possesses these parameters may use the evaluation system directly without first carrying out the training or even having to possess only training data. The present invention therefore also relates to a parameter set containing parameters which characterize the behavior of a trainable evaluation system and which were obtained with the aid of the training method described above.

In particular, it is possible, for example, to train only a new input stage and optionally also a new output stage, based on a finished, purchased parameter set to enable the evaluation system to process measured data from a novel sensor (for example, a new camera). The parameters of the processing stage may be recorded. This is advantageous, in particular, for applications in driving assistance systems, systems for at least semi-automated driving or other safety-critical system. For example, a general certification or other official permit may be tied to a specific state of the processing stage approved by TUV (Technical Inspection Agency) or another monitoring organization.

The example methods may be, in particular, entirely or partially computer-implemented. The present invention therefore also relates to a computer program, including machine-readable instructions which prompt the computer to carry out one of the described methods when run on one or multiple computers. In this sense, control units for vehicles and embedded systems for technical devices, which are also able to carry out machine-readable instructions, are also to be viewed as computers.

Likewise, the present invention also relates to a machine-readable data carrier and/or to a download product, including the parameter set and/or the computer program. A download product is a downloadable digital product which is transferable via a data network, i.e., by a user of the data network, which may be offered for sale in an online shop for immediate downloading.

A computer may furthermore be equipped with the computer program, with the machine-readable data carrier or with the download product.

Further measures which improve the present invention are illustrated in greater detail below, together with the description of the preferred exemplary embodiments of the present invention.

DETAILED DESCRIPTION OF EXAMPLE EMBODIMENT

Figure 1:
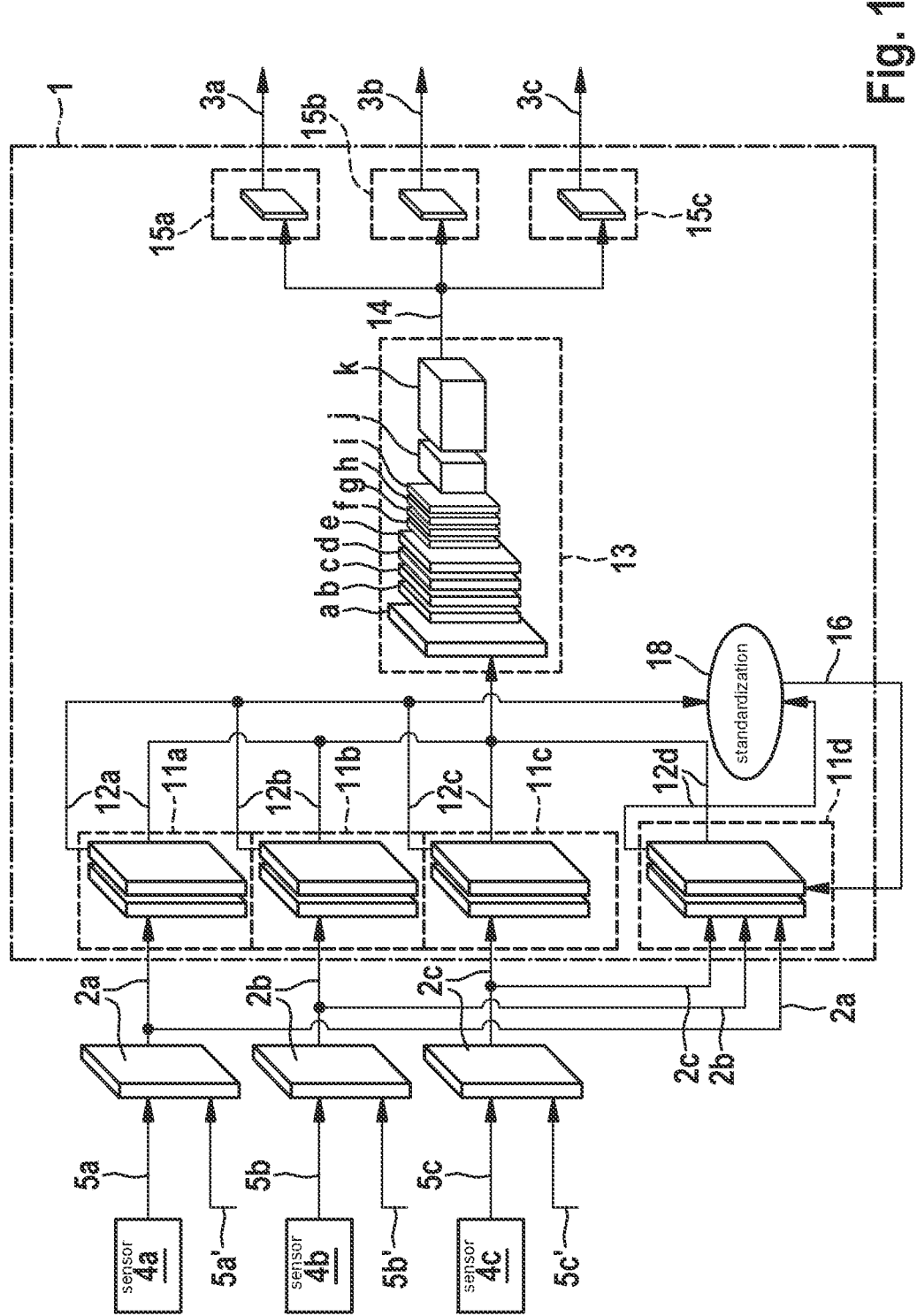
FIG. 1 shows an exemplary embodiment of evaluation system 1.

FIG. 1 shows an exemplary embodiment of evaluation system 1 in accordance with the present invention. Evaluation system 1 includes three input stages 11a through 11c, which are designed to receive measured data 2a through 2c and process them into precursors 12a through 12c. In addition, evaluation system 1 also includes a universal input stage 11d, which also receives all the measured data which are supplied to the other input stages 11a through 11c as inputs and processes them to a precursor 11d.

Measured data 2a through 2c may be, in particular, physical measured data 5a through 5c, which were detected with the aid of different sensors 4a through 4c. Alternatively or also in combination herewith, measured data 2a through 2c may also include realistic synthetic measured data 5a' through 5c' of these sensors 4a through 4c.

Each of input stages 11a through 11d contains neurons and/or other processing units of an ANN, which are arranged in this example in two layers a and b. In the example illustrated in FIG. 1, the two layers a and b are designed as convolution layers.

All precursors 11a through 11d are generally guided into processing stage 13 and are processed by processing stage 13 into an intermediate product 14. Processing stage 13 also contains neurons and/or other processing units of the ANN, which are arranged in layers a through k. In the example illustrated in FIG. 1, layers a through i are designed as convolution layers. Layers j and k in this example are designed as pooling layers, but may also be designed, for example, as further convolution layers.

Intermediate product 14 is guided into three output stages 15a through 15c. In the example illustrated in FIG. 1, output stages 15a through 15c each include a fully networked layer of the ANN and supply evaluation results 3a through 3c of evaluation system 1.

As indicated by the dashed lines in FIG. 1, parameters 16, which characterize the behavior of universal input stage 11d, are optimized in such a way that precursor 12d supplied by universal input stage 11d for one situation coincides preferably well with precursors 12a through 12c of the other input stages 11a through 11c for the same situation in accordance with standardization measure 18.

Figure 2:
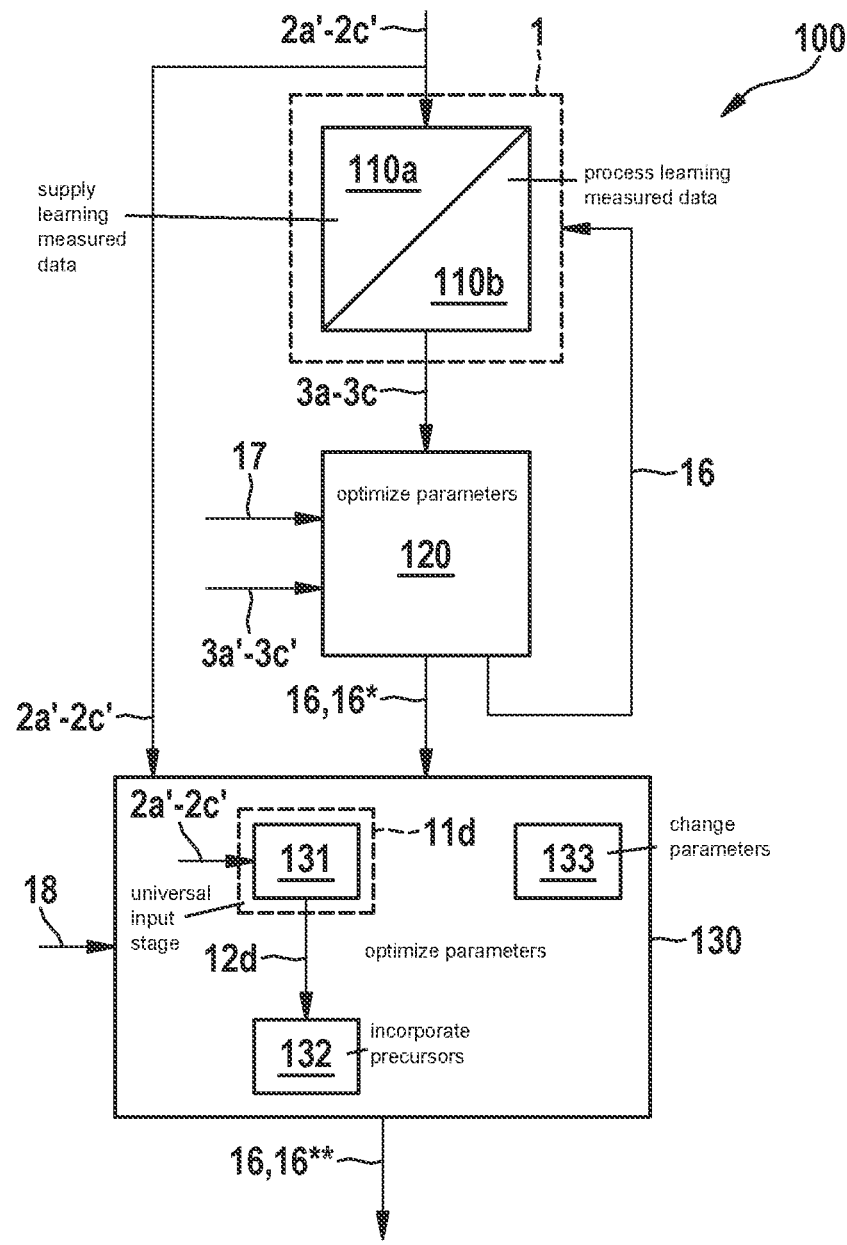
FIG. 2 shows an exemplary embodiment of method 100 for training evaluation system 1.

FIG. 2 shows a schematic flowchart of one exemplary embodiment of method 100 for training evaluation system 1. In step 110a of method 100, learning measured data 2a' through 2c' are supplied to evaluation system 1. These learning measured data 2a' through 2c' may be an arbitrary mixture of physical measured data 5a through 5c, which were detected with the aid of different sensors 4a through 4c, and synthetic measured data 5a' through 5c' of sensors 4a through 4c. Learning measured data 2a' through 2ac' are supplied to different input stages 11a through 11c of evaluation system 1. In step 110b, learning measured data 2a' through 2c' are processed by evaluation system 1 into evaluation results 3a through 3c.

In step 120, parameters 16, which characterize the behavior of evaluation system 1, are optimized with the goal that evaluation results 3a through 3c coincides preferably well with learning evaluation results 3a' through 3c', with which learning measured data 2a' through 2c' are labeled, in accordance with a cost function 17. For this purpose, parameters 16 are continuously adapted, and the processing of learning measured data 2a' through 2c' into evaluation results 3a through 3c is again carried out to subsequently test whether the conformity with learning evaluation results 3a' through 3c' has improved. The optimization ends when a predefined abortion criterion is met. The abortion criterion may relate, for example, to the accuracy of the conformity and/or to a maximum number of iterations. The state of parameters 16 then obtained is trained state 16*.

Parameters 16, 16* are additionally optimized in step 130 with respect to standardization measure 18. As illustrated in FIG. 2, this may take place after the actual training of evaluation system 1, using cost function 17. However, it may also take place simultaneously with this training, for example in that standardization measure 18 is integrated into cost function 17. Standardization measure 18 supplies better values the better the precursors 12a through 12d, generated by different input stages 11a through 11d and relating to the same situation, coincide with one another.

For this purpose, learning measured data 2a' through 2c', which are supplied to the at least two different input stages 11a through 11c of evaluation system 1, are also supplied to universal input stage 11d, in particular according to block 131, so that they are processed into precursors 12d. According to block 132, precursors 12d supplied by this universal input stage 11d are incorporated into the assessment by standardization measure 18. The extent to which these precursors 12d are uniform with precursors 12a through 12c generated by the other input stages 11a through 11c is therefore measured. Parameters 16 continue to be varied until a predefined abortion criterion is met, for example with respect to the desired conformity of precursors 12a through 12d and/or with respect to a maximum number of iterations.

In particular, according to block 133, only those parameters 16 of evaluation system 1 characterizing the behavior of universal input stage 11d may be changed, for example during optimization 130 of standardization measure 18. The previously compiled training of the other input stages 11a through 11c, processing stage 13, and output stages 15a through 15c is thus retained.

Parameters 16 optimized with respect to the standardization measure are designated by reference numeral 16**.

Figure 3:
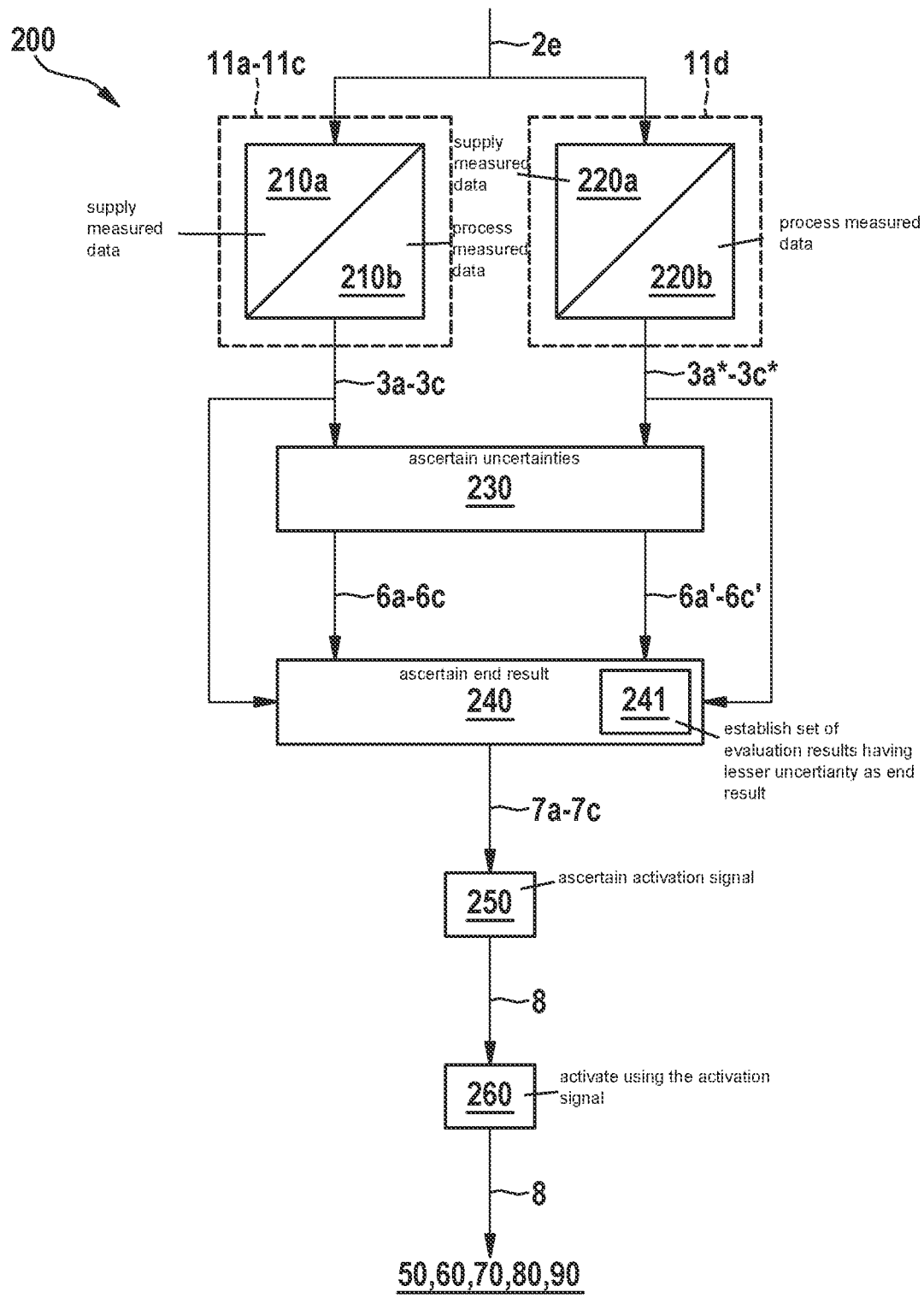
FIG. 3 shows an exemplary embodiment of method 200 for operating evaluation system 1.

FIG. 3 shows a schematic flowchart of one exemplary embodiment of method 200 for operating evaluation system 1 in its finally trained state. A set of measured data 2e is supplied to a first input stage 11a through 11c of evaluation system 1 in step 210a and processed into a first set of evaluation results 3a through 3c in step 210b. The same set of measured data 2e is supplied to universal input stage 11d of evaluation system 1 in step 220a and processed into a second set of evaluation results 3a* through 3c* in step 220b. Although only the one universal input stage 11d is used, which supplies a single precursor 12d, after processing this precursor 12d into an intermediate product 14 by processing stage 13, the three output stages 15a through 15c may continue to supply different evaluation results 3a* through 3c*.

Uncertainties 6a through 6c of first set of evaluation results 3a through 3c and uncertainties 6a' through 6c' of second set of evaluation results 3a* through 3c* are ascertained in step 230.

In step 240, an end result 7a through 7c of the processing is ascertained from the two sets of evaluation results 3a through 3c, 3a* through 3c* and associated uncertainties 6a through 6c, 6a' through 6c'. For example, according to block 241, in particular, that set of evaluation results 3a through 3c, 3a' through 3c' having lesser uncertainty 6a through 6c, 6a' through 6c' may be established for this purpose as end result 7a through 7c of the processing.

In step 250, an activation signal 8 is additionally ascertained from end result 7a through 7c of the processing. In step 260, a vehicle 50, a system 60 for monitoring an area, a classification system 70, a system 80 for the quality control of series-manufactured products and/or a system 90 for medical imaging are activated with the aid of activation signal 8.

What is claimed is:

1. A method for training an evaluation system, the evaluation system being configured for processing measured data, including physical measured data which were detected using one or multiple sensors, and/or realistic synthetic measured data of the one or multiple sensors, into one or multiple evaluation results, the evaluation system including at least two input stages independent from each other, which are configured to receive the measured data and process the measured data into precursors, at least one processing stage configured to receive the precursors from all input stages as inputs and configured to process one or multiple of the input precursors into a shared intermediate product, and at least one output stage configured to process the intermediate product into one or multiple evaluation results of the evaluation system, the method comprising the following steps:

supplying learning measured data to the evaluation system;

processing, by the evaluation system, the learning measured data into evaluation results; and optimizing parameters which characterize a behavior of the evaluation system with a goal that the evaluation results coincide well with learning evaluation results belonging to the learning measured data in accordance with at least one cost function, the learning measured data, which are supplied to the at least two input stages of the evaluation system, including physical measured data which were detected by different sensors, and/or realistic synthetic measured data of the different sensors.

2. The method as recited in claim 1, wherein the parameters are additionally optimized with respect to a standardization measure, which supplies better values the better the precursors, generated by the input stages and which relate to the same situation, coincide with one another.

3. The method as recited in claim 2, wherein:
the learning measured data, which are supplied to at least two different ones of the input stages of the evaluation system, are also supplied to a further universal input stage; and
the precursors supplied by the universal input stage are incorporated into an assessment by the standardization measure.

4. The method as recited in claim 3, wherein, during the optimization of the parameters with respect to the standardization measure, only those parameters of the evaluation system are changed which characterize behavior of the universal input stage.

5. A method for operating an evaluation system, the evaluation system being configured for processing measured data, including physical measured data which were detected using one or multiple sensors, and/or realistic synthetic measured data of the one or multiple sensors, into one or multiple evaluation results, the evaluation system including at least two input stages independent from each other, which are configured to receive the measured data and process the measured data into precursors, at least one processing stage configured to receive the precursors from all input stages as inputs and configured to process one or multiple of the input precursors into a shared intermediate product, and at least one output stage configured to process the intermediate product into one or multiple evaluation results of the evaluation system, the evaluation system being trained by: supplying learning measured data to the evaluation system, processing, by the evaluation system, the learning measured data into evaluation results, and optimizing parameters which characterize a behavior of the evaluation system with a goal that the evaluation results coincide well with learning evaluation results belonging to the learning measured data in accordance with at least one cost function, the learning measured data, which are supplied to the at least two input stages of the evaluation system, including physical measured data which were detected by different sensors, and/or realistic synthetic measured data of the different sensors, the method for operating the evaluation system comprising the following steps:
supplying a set of measured data to a first input stage of the at least two input stages of the evaluation system;
processing, by the evaluation system, the supplied set of measured data into a first set of evaluation results;
supplying the set of measured data to a universal input stage of the evaluation system and processing the supplied set of measured data by the evaluation system into a second set of evaluation results;
ascertaining associated uncertainties of the first set of evaluation results and associated uncertainties of the second set of evaluation results;
ascertaining an end result from the first and second sets of evaluation results and the associated uncertainties.

6. The method as recited in claim 5, wherein that set of evaluation results of the first and second sets of results, having a lesser uncertainty, is established as the end result.

7. The method as recited in claim 5, further comprising:
ascertaining an activation signal from the end result of the processing; and
activating, using the activation signal, a vehicle, and/or a system for monitoring an area, and/or a classification system, and/or a system for quality control of series-manufactured products, and/or a system for medical imaging.

8. The method as recited in claim 5, wherein the physical measured data, or the realistic synthetic measured data, are: (i) measured data of an optical or thermal camera, and/or (ii) measured data of a scan of a spatial area using radar, and/or LIDAR, and/or ultrasound.

9. The method as recited in claim 5, wherein the evaluation results include:
at least one class ascertained from the measured data as the result of a classification; and/or
at least one regression value ascertained from the measured data as the result of a regression; and/or
at least one semantic segmentation of the measured data; and/or
at least one image reconstructed from the measured data; and/or
synthetic measured data.

10. A non-transitory machine-readable data carrier on which is stored a parameter set including parameters, which characterize a behavior of an evaluation system, the evaluation system being configured for processing measured data, including physical measured data which were detected using one or multiple sensors, and/or realistic synthetic measured data of the one or multiple sensors, into one or multiple evaluation results, the evaluation system including at least two input stages independent from each other, which are configured to receive the measured data and process the measured data into precursors, at least one processing stage configured to receive the precursors from all input stages as inputs and configured to process one or multiple of the input precursors into a shared intermediate product, and at least one output stage configured to process the intermediate product into one or multiple evaluation results of the evaluation system, the evaluation system being trained by: supplying learning measured data to the evaluation system, processing, by the evaluation system, the learning measured data into evaluation results, and optimizing parameters which characterize a behavior of the evaluation system with a goal that the evaluation results coincide well with learning evaluation results belonging to the learning measured data in accordance with at least one cost function, the learning measured data, which are supplied to the at least two input stages of the evaluation system, including physical measured data which were detected by different sensors, and/or realistic synthetic measured data of the different sensors.

11. A non-transitory machine-readable data carrier on which is stored a computer program for operating an evaluation system, the evaluation system being configured for processing measured data, including physical measured data which were detected using one or multiple sensors, and/or realistic synthetic measured data of the one or multiple sensors, into one or multiple evaluation results, the evaluation system including at least two input stages independent from each other, which are configured to receive the measured data and process the measured data into precursors, at least one processing stage configured to receive the precursors from all input stages as inputs and configured to process one or multiple of the input precursors into a shared intermediate product, and at least one output stage configured to process the intermediate product into one or multiple evaluation results of the evaluation system, the evaluation system being trained by: supplying learning measured data to the evaluation system, processing, by the evaluation system, the learning measured data into evaluation results, and optimizing parameters which characterize a behavior of the evaluation system with a goal that the evaluation results coincide well with learning evaluation results belonging to the learning measured data in accordance with at least one cost function, the learning measured data, which are supplied to the at least two input stages of the evaluation system, including physical measured data which were detected by different sensors, and/or realistic synthetic measured data of the different sensors, the computer program, when executed by a computer, causing the computer to perform the following steps:

supplying a set of measured data to a first input stage of the at least two input stages of the evaluation system;

processing, by the evaluation system, the supplied set of measured data into a first set of evaluation results;

supplying the set of measured data to a universal input stage of the evaluation system and processing the supplied set of measured data by the evaluation system into a second set of evaluation results;

ascertaining associated uncertainties of the first set of evaluation results and associated uncertainties of the second set of evaluation results;

ascertaining an end result from the first and second sets of evaluation results and the associated uncertainties.

* * * * *